(12) United States Patent
Iwami

(10) Patent No.: US 7,724,677 B2
(45) Date of Patent: May 25, 2010

(54) STORAGE SYSTEM AND METHOD FOR CONNECTIVITY CHECKING

(75) Inventor: Naoko Iwami, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 1436 days.

(21) Appl. No.: 11/016,814

(22) Filed: Dec. 21, 2004

(65) Prior Publication Data

US 2006/0092843 A1 May 4, 2006

(30) Foreign Application Priority Data

Oct. 29, 2004 (JP) ............................. 2004-315482

(51) Int. Cl.
*H04L 12/26* (2006.01)
*G06F 15/173* (2006.01)

(52) U.S. Cl. ...................................... 370/248; 709/224

(58) Field of Classification Search ....................... None
See application file for complete search history.

(56) References Cited

U.S. PATENT DOCUMENTS

| 5,175,800 | A * | 12/1992 | Galis et al. ..................... 706/45 |
| 6,507,869 | B1 * | 1/2003 | Franke et al. ................. 709/224 |
| 6,757,291 | B1 * | 6/2004 | Hu .............................. 370/401 |
| 6,763,479 | B1 * | 7/2004 | Hebert ........................... 714/4 |
| 6,976,103 | B1 * | 12/2005 | Watanabe et al. ............. 710/74 |
| 7,236,488 | B1 * | 6/2007 | Kavipurapu ................. 370/388 |
| 2003/0182516 | A1 * | 9/2003 | Fujimoto ..................... 711/148 |
| 2005/0007959 | A1 * | 1/2005 | Tomonaga et al. .......... 370/248 |
| 2005/0010688 | A1 * | 1/2005 | Murakami et al. .......... 709/245 |
| 2005/0076113 | A1 * | 4/2005 | Klotz et al. ................. 709/224 |
| 2005/0114496 | A1 * | 5/2005 | Fang et al. .................. 709/224 |
| 2005/0198276 | A1 * | 9/2005 | Shiga et al. ................. 709/224 |
| 2005/0203910 | A1 * | 9/2005 | Taguchi et al. ................ 707/10 |
| 2006/0002292 | A1 * | 1/2006 | Chang et al. ................ 370/225 |
| 2006/0085522 | A1 * | 4/2006 | Spry .......................... 709/220 |
| 2008/0198767 | A1 * | 8/2008 | Lebrun et al. ............... 370/254 |

FOREIGN PATENT DOCUMENTS

| JP | 2000069119 A | 3/2000 |
| JP | 2003-345631 | 12/2003 |

OTHER PUBLICATIONS

Notification of Reasons for Refusal, dated Sep. 1, 2009, issued in corresponding Japanese Patent Application No. 2004-315482 along with English language translation.

* cited by examiner

*Primary Examiner*—Ricky Ngo
*Assistant Examiner*—Clemence Han
(74) *Attorney, Agent, or Firm*—Brundidge & Stanger, P.C.

(57) ABSTRACT

The invention is intended to provide a connectivity checking technology to make it easier to check the connectivity of data communication paths in an IP storage system. The target computer 20 of the storage system 10 transmits an ICMP echo request to an initiator computer 70 through a prescribed IP port 110 in the storage system 10, and determines whether or not the connectivity is normal between the target computer 20 and initiator computer 70 through the prescribed IP port 110 based on a reachable status of the ICMP echo reply from the initiator computer 70.

24 Claims, 22 Drawing Sheets

Fig.4

<TARGET CONFIGURATION TABLE>

| TARGET NAME | VOLUME NAME | STORAGE CAPACITY |
|---|---|---|
| TARGET TA1 | VOLUME B01 | 10GB |
| | VOLUME B02 | 10GB |
| TARGET TA2 | VOLUME B03 | 10GB |

Fig.5

<PATH CONFIGURATION TABLE> ~5000

| TARGET NAME 5010 | INITIATOR NAME 5020 | INITIATOR ADDRESS 5030 | DATA COMMUNICATION PATH (IP PORT NAME) 5040 | TCP PORT NUMBER 5050 | AUTHENTICATION INFORMATION 5060 |
|---|---|---|---|---|---|
| TARGET TA1 | INITIATOR IT1 | 123.4.9.01 | PORT PO1 | 3260 | XXX |
| | | | PORT PO2 | 3260 | |
| | INITIATOR IT2 | 123.4.9.04 | PORT PO1 | 3260 | YYY |
| | | | PORT PO2 | 3260 | |
| TARGET TA2 | INITIATOR IT3 | 123.4.9.08 | PORT PO2 | 3260 | ZZZ |

Fig.9

RESULTS OF NEW PATH CONFIGURATION — WD1

| PATH NO | TARGET NAME | IP PORT NAME | INITIATOR NAME | CONNECTIVITY | REASON FOR NOT NORMAL |
|---|---|---|---|---|---|
| 1 | TARGET TA1 | PORT P01 | INITIATOR IT1 | NORMAL | - |
| 2 | TARGET TA1 | PORT P01 | INITIATOR IT2 | NORMAL | - |
| 3 | TARGET TA1 | PORT P02 | INITIATOR IT1 | NORMAL | - |
| 4 | TARGET TA1 | PORT P02 | INITIATOR IT2 | NOT NORMAL | DESTINATION UNREACHABLE |

Fig.11

<STORAGE DOMAIN TABLE>

| STORAGE DOMAIN NAME | NODE NAME | ATTRIBUTE |
|---|---|---|
| STORAGE DOMAIN SD1 | INITIATOR IT1 | INITIATOR |
| | INITIATOR IT2 | INITIATOR |
| | TARGET TA1 | TARGET |
| STORAGE DOMAIN SD2 | INITIATOR TI3 | INITIATOR |
| | TARGET TA2 | TARGET |

<INITIATOR ADDRESS TABLE>

| INITIATOR NAME | INITIATOR ADDRESS |
|---|---|
| INITIATOR IT1 | 123.4.9.01 |
| INITIATOR IT2 | 123.4.9.04 |
| INITIATOR IT3 | 123.4.9.08 |

RESULTS OF EXISTING PATH CHECKING — WD2

| PATH NO | TARGET NAME | IP PORT NAME | INITIATOR NAME | CONNECTIVITY | REASON FOR NOT NORMAL |
|---|---|---|---|---|---|
| 1 | TARGET TA1 | PORT P01 | INITIATOR IT1 | NORMAL | – |
| 2 | TARGET TA1 | PORT P01 | INITIATOR IT2 | NORMAL | – |
| 3 | TARGET TA1 | PORT P02 | INITIATOR IT1 | NOT NORMAL | DESTINATION UNREACHABLE |
| 4 | TARGET TA1 | PORT P02 | INITIATOR IT2 | NORMAL | – |
| 5 | TARGET TA2 | PORT P02 | INITIATOR IT3 | NOT NORMAL | TIME EXCEEDED |

Fig.16

<IP PORT COMMUNICATION STATISTIC TABLE>

| IP PORT NAME | CONNECTIVITY | LOAD RATE |
|---|---|---|
| PORT PO1 | NORMAL | 10% |
| PORT PO2 | CLOSED | – |
| PORT PO3 | NORMAL | 86% |
| PORT PO4 | NORMAL | 12% |
| PORT PO5 | NORMAL | 36% |
| PORT PO6 | NORMAL | 8% |
| PORT PO7 | NORMAL | 5% |
| ⋮ | ⋮ | ⋮ |
| PORT PO16 | NORMAL | 27% |

Fig.17

<PORT ADDRESS TABLE>

| IP PORT NAME | PORT ADDRESS |
|---|---|
| PORT PO1 | 123.4.6.01 |
| PORT PO2 | 123.4.6.02 |
| PORT PO3 | 123.4.6.03 |
| ⋮ | ⋮ |
| PORT PO16 | 123.4.6.16 |

Fig.18

RESULTS OF PATH RESTORATION  WD3

| PATH NO | TARGET NAME | IP PORT NAME | INITIATOR NAME | RESULT FOR PROCESS |
|---|---|---|---|---|
| 1 | TARGET TA1 | PORT PO1 | INITIATOR IT1 | GOOD |
| 2 | TARGET TA1 | PORT PO1 | INITIATOR IT2 | GOOD |
| 3 | TARGET TA1 | PORT PO4 | INITIATOR IT1 | MODIFIED (PORT PO2→PORT PO4) |
| 4 | TARGET TA1 | PORT PO4 | INITIATOR IT2 | MODIFIED (PORT PO2→PORT PO4) |
| 5 | TARGET TA2 | PORT PO2 | INITIATOR IT3 | HIGH LOAD (RESTORATION FAILED) |

Fig.21

<PORT ADDRESS TABLE>

| IP PORT NAME | PORT ADDRESS | PORT ADDRESS | PORT ADDRESS |
|---|---|---|---|
| PORT PO1 | 123.4.6.01 | 123.4.6.02 | – |
| PORT PO2 | 123.4.6.02 | – | – |
| PORT PO3 | 123.4.6.03 | 123.4.6.02 | 123.4.6.05 |
| ⋮ | ⋮ | ⋮ | ⋮ |
| PORT PO16 | 123.4.6.16 | – | – |

STORAGE SYSTEM AND METHOD FOR CONNECTIVITY CHECKING

CROSS-REFERENCES TO RELATED APPLICATION

This application relates to and claims priority from Japanese Patent Application No. P2004-315482, filed on Oct. 29, 2004, the entire disclosure of which is incorporated herein by reference.

BACKGROUND

The present invention relates to connectivity checking technology for checking connectivity on an Internet Protocol (IP) network in a storage system for transmitting storage data across the IP network.

Practical use has recently been made of IP storage systems in which storage data is transmitted across IP networks. Known technologies for realizing the IP storage systems, for example, include an iSCSI (internet Small Computer System Interface) in which SCSI commands are mapped to an IP, a FCIP (Fiber Channel over IP) in which a plurality of independent FC-LANs (Fiber Channel-Local Area Networks) are connected to each other though IP tunnels, and an iFCP (internet Fiber Channel Protocol) for mapping and routing FC (Fiber Channel) addresses and IP addresses. In IP storage systems based on the iSCSI protocol, for example, iSCSI sessions are run on TCP (Transmission Control Protocol) connections via an IP network to transmit storage data across the IP network.

An IP storage system generally comprises a plurality of connecting ports for connecting to an IP network, and a target computer for providing a prescribed storage volume, or storage area, via a prescribed connecting port among the plurality of connecting ports to an initiator computer connected to the IP network. The prescribed connecting port is pre-configured on the target computer side for a data communication path between the initiator computer and the target computer. The initiator computer establishes a communication session with the target computer via the prescribed connecting port which has been pre-configured for the data communication path, so as to utilize the prescribed storage volume provided by the target computer. Japanese Published Unexamined Application 2003-345631, for example, discloses an IP storage system for transmitting storage data across an IP network.

SUMMARY

However, because the prescribed connecting port has conventionally been configured for the data communication path on the IP storage system side, and the data communication path has then been checked by trying to access from the initiator computer side based on a configuration of the data communication path, whenever there are any access malfunctions in the configured data communication path, a resulting problem is the need for the cumbersome task of repeatedly configuring the data communication path on the IP storage system side and checking the connectivity on the initiator computer side. The access malfunctions, for example, include a malfunction of a relay on the IP network, an error in a path configuration on a relay side on the IP network, a restriction of access due to a firewall, an excessive communication load, and a malfunction of the connecting port.

Therefore, there is need to provide a connectivity checking technology that resolves the above problem and make it easier to check the connectivity of the data communication path in the IP storage system.

In order to resolve the problem described above, the present invention is directed to a connectivity checking method for checking connectivity between an initiator computer and a target computer in a storage system, said storage system comprising a plurality of connecting ports for connecting to an Internet Protocol network, and said target computer for providing a prescribed storage volume via any of said plurality of connecting ports to said initiator computer connected to said network, said connectivity checking method comprising: transmitting an echo request based on an Internet Control Message Protocol from said target computer to said initiator computer via a prescribed connecting port among said plurality of connecting ports; and determining said connectivity via said prescribed connecting port based on a reachable status of an echo reply in said target computer, said echo reply transmitted from said initiator computer in response to said transmitted echo request.

In order to resolve the problem described above, the present invention is directed to a storage system comprising a plurality of connecting ports for connecting to an Internet Protocol network, and a target computer for providing a prescribed storage volume via any of said plurality of connecting ports to a initiator computer connected to said network, said storage system further comprising: an echo request unit for transmitting an echo request based on an Internet Control Message Protocol from said target computer to said initiator computer via a prescribed connecting port among said plurality of connecting ports; and a connectivity checking unit that determines a connectivity between said target computer and said initiator computer via said prescribed connecting port based on a reachable status of an echo reply in said target computer, said echo reply transmitted from said initiator computer in response to said transmitted echo request.

The connectivity checking method and storage system of the invention make it easier to check the connectivity of the data communication path without the need for trying to access from the initiator computer side in order to check connectivity because it can be determined from the storage system side the connectivity of the data communication path by transmitting an echo request based on an Internet Control Message Protocol (ICMP) from the target computer to the initiator computer. These and other objects, features, aspects, and advantages of the present invention will become more apparent from the following detailed description of the preferred embodiments with the accompanying drawings.

BRIEF DESCRIPTION OF THE DRAWINGS

FIG. 4 illustrates an example of a target configuration table 4000;

FIG. 5 illustrates an example of a path configuration table 5000;

FIG. 9 illustrates an example of information of the new path configuration process;

FIG. 11 illustrates an example of a storage domain table 11000;

FIG. 12 illustrates an example of an initiator address table 12000;

FIG. 14 illustrates an example of information of the existing path checking process;

FIG. 16 illustrates an example of an IP port communication statistic table 16000;

FIG. 17 illustrates an example of a port address table 17000;

FIG. 18 illustrates an example of information of the path restoration process;

FIG. 21 illustrates a port address table for the other embodiment;

DESCRIPTION OF THE PREFERRED EMBODIMENTS

In order to further clarify the construction and operation of the present invention described above, the connectivity checking technology in which the present invention is applied will be described below according to the following sequence:

A. Structure of Electronic Computer System CS;
  A(1). Physical Structure of Electronic Computer System CS;
  A(2). Logical Structure of Electronic Computer System CS;
B. Operation of Electronic Computer System CS;
  B(1). Process for Checking Connectivity of New Path;
  B(2). Process for Checking Connectivity of Existing Path;
  B(3). Process for Path Restoration during Malfunction or High Load;
C. Other Embodiments.

Figure 1:
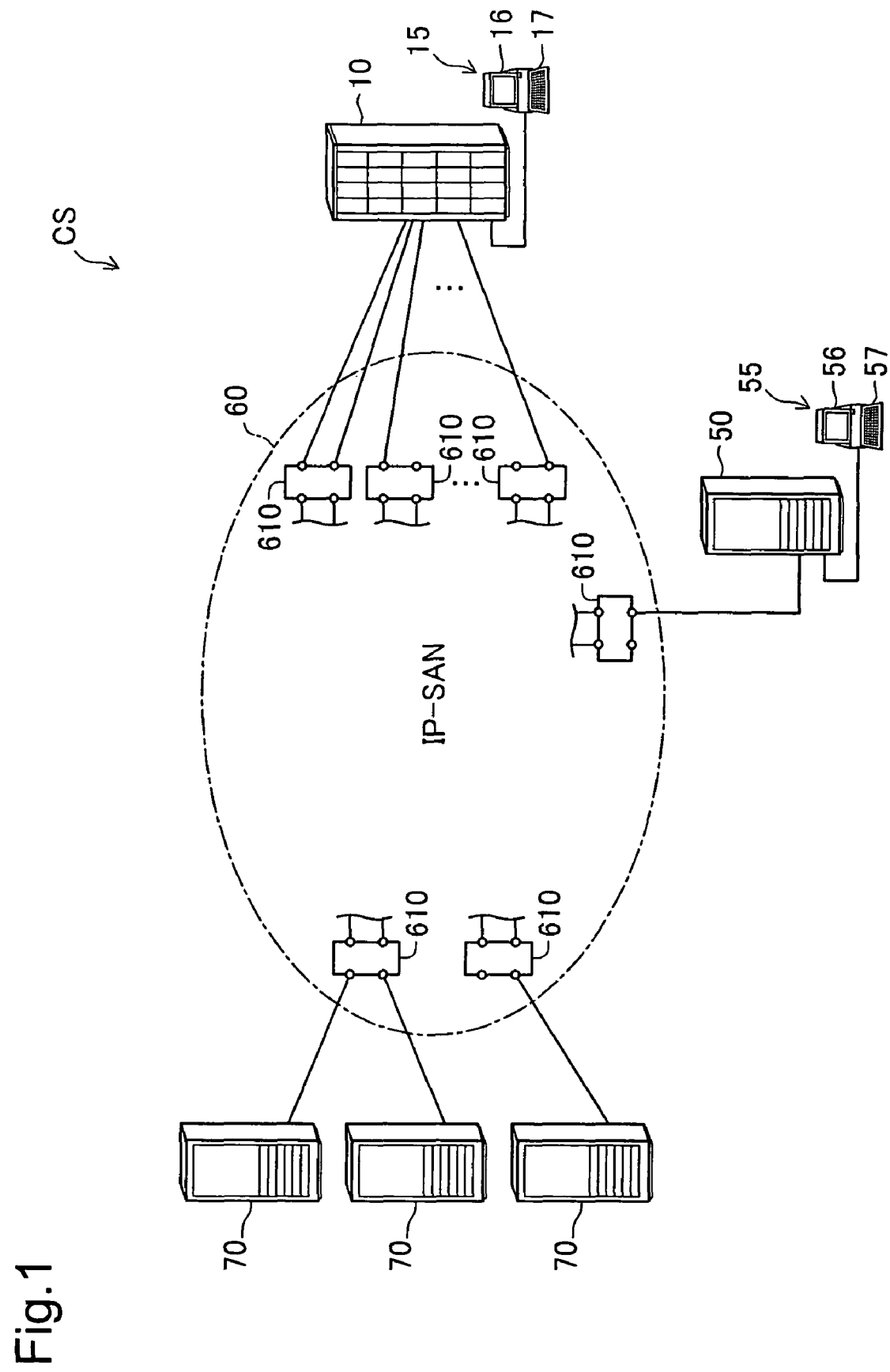
FIG. 1 illustrates the physical structure of an electronic computer system CS.

A. Structure of Electronic Computer System CS:

A(1). Physical Structure of Electronic Computer System CS:

FIG. 1 illustrates the physical structure of an electronic computer system CS. The electronic computer system CS, which is an embodiment of the invention, comprises a storage system 10 that constructs storage volumes (referred to as "volume(s)" below) which are storage areas for storing prescribed data, initiator computers 70 that utilize the volumes of the storage system 10, and an iSNS (internet Storage Name Service) server 50 that manages relationships between the storage system 10 and the initiator computers 70. The storage system 10, initiator computers 70, and iSNS server 50 are connected to each other by a plurality of IP switches 610 that transfer IP packets and constitute an IP network that is an IP-SAN (IP-Storage Area Network) 60. The storage system 10, initiator computers 70, and iSNS server 50 are capable of data communication each other via IP-SAN 60. The storage system 10, initiator computers 70, iSNS server 50, and IP switches 610 are devices meeting various types of protocols, such as an IP protocol, a TCP protocol, and an ICMP protocol.

The storage system 10 and initiator computers 70 are also devices meeting an iSCSI protocol for transmitting storage data across the IP-SAN 60.

Figure 2:
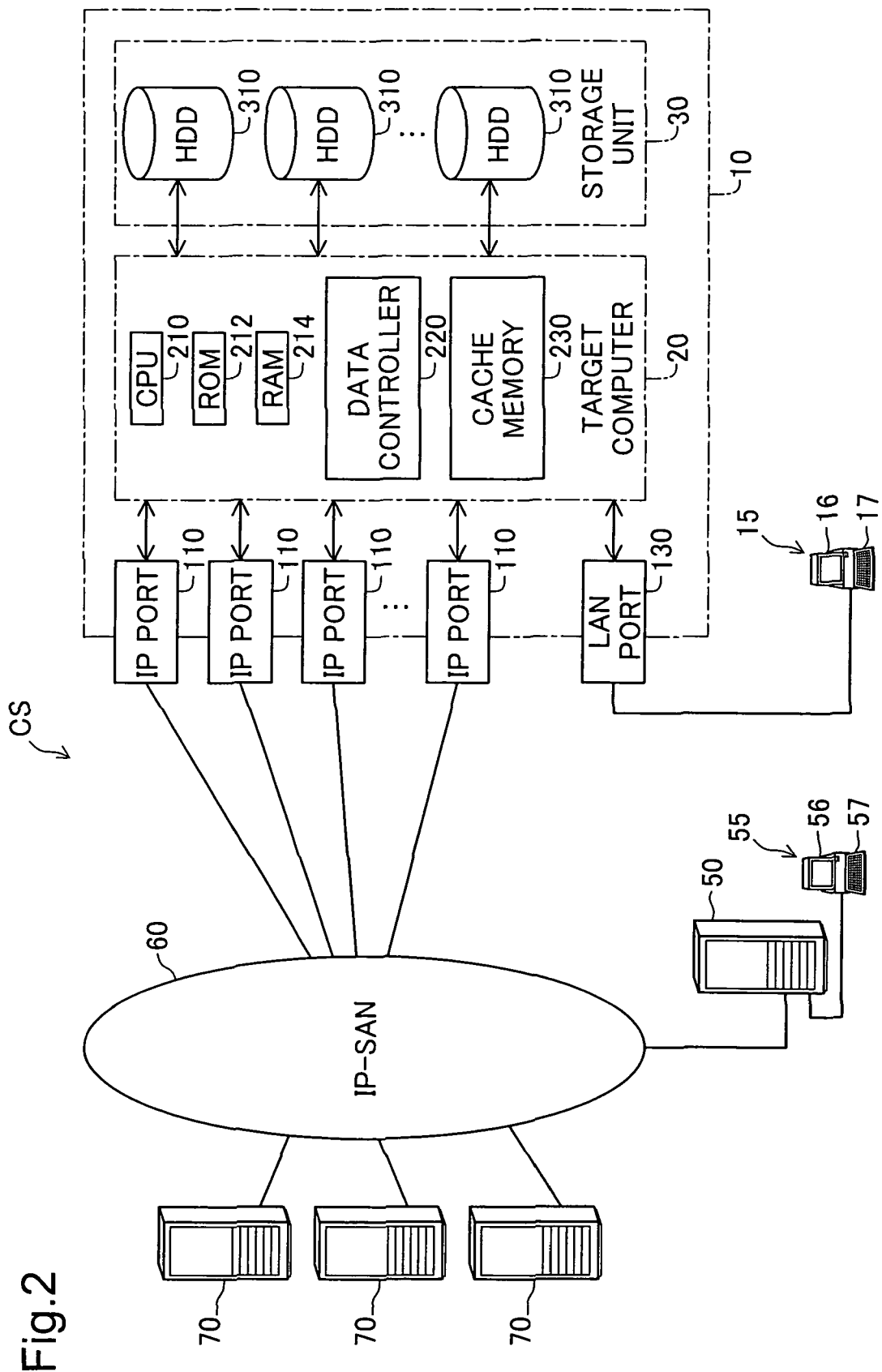
FIG. 2 is a block diagram of primarily the internal arrangement of the storage system 10.

FIG. 2 is a block diagram of primarily the internal arrangement of the storage system 10. The storage system 10 comprises a plurality of IP ports 110 for connecting to the IP-SAN 60, a storage unit 30 that comprises a plurality of hard disk drives (HDDs) 310 for logically constructing the volumes, a target computer 20 for providing the prescribed volumes constructed on the storage unit 30 through any of the plurality of IP ports 110 to the initiator computers 70, and a LAN port 130 for connecting the target computer 20 to a LAN (Local Area Network). In this embodiment, the storage system 10 also comprises sixteen IP ports 110, and the sixteen IP ports 110 are each assigned a port address which is IP address indicating a location of the port on the IP-SAN 60.

The target computer 20 of the storage system 10 comprises a central processing unit (CPU) 210 that runs arithmetic processing for controlling each part of the target computer 20, a read only memory (ROM) 212 for preliminarily storing programs defining the arithmetic processing of the CPU 210, a random access memory (RAM) 214 for temporarily storing data handled by the CPU 210, a data controller 220 that has a circuit for controlling the transfer of storage data between the plurality of IP ports 110 and the plurality of HDDs 310, and a cache memory 230 for temporarily storing data handled by the data controller 220.

Programs run by the CPU 210 which are stored in ROM 212 of the target computer 20 include an operating system (OS), as well as various types of application software (referred to below as applications). The applications stored in ROM 212 include programs using RAID (Redundant Arrays of Independent (Inexpensive) Disks) technology to control the plurality of HDDs 310 in the storage unit 30, and ping (Packet INternet Groper) which is a program for diagnosing IP networks based on the ICMP protocol. These programs may be stored on external memory devices such as HDD, and may be loaded on the RAM 214 at start up and run.

The LAN port 130 of the storage system 10 is connected to a management terminal 15 comprising a variety of user interfaces such as a display 16 and a keyboard 17. The storage controller 20 is capable of data communication with an administrator of the storage system 10 by the management terminal 15.

The initiator computers 70 are computers comprising hardware such as a CPU, ROM, RAM, HDD, and various interface circuits. An OS and various applications are installed on the initiator computers 70. Applications for running data processing, applications for utilizing the storage system 10, and the like are installed on the initiator computers 70.

The iSNS server 50 is a computer comprising hardware such as a CPU, ROM, RAM, HDD, and various interface circuits. An OS and various applications are installed on the iSNS server 50. Data registered in the iSNS server 50 includes data by which the storage system 10 and initiator computers 70 retrieve communication parties, such as storage domains in which the relation between the storage system 10 and initiator computers 70 is defined, and IP address indicating the location of the storage system 10 or initiator computers 70 on the network. The iSNS server 50 is connected to a management terminal 55 that comprises various user interfaces such as a display 56 and keyboard 57. The iSNS server 50 is capable of data communication with an administrator of the iSNS server 50 by the management terminal 55.

Figure 3:
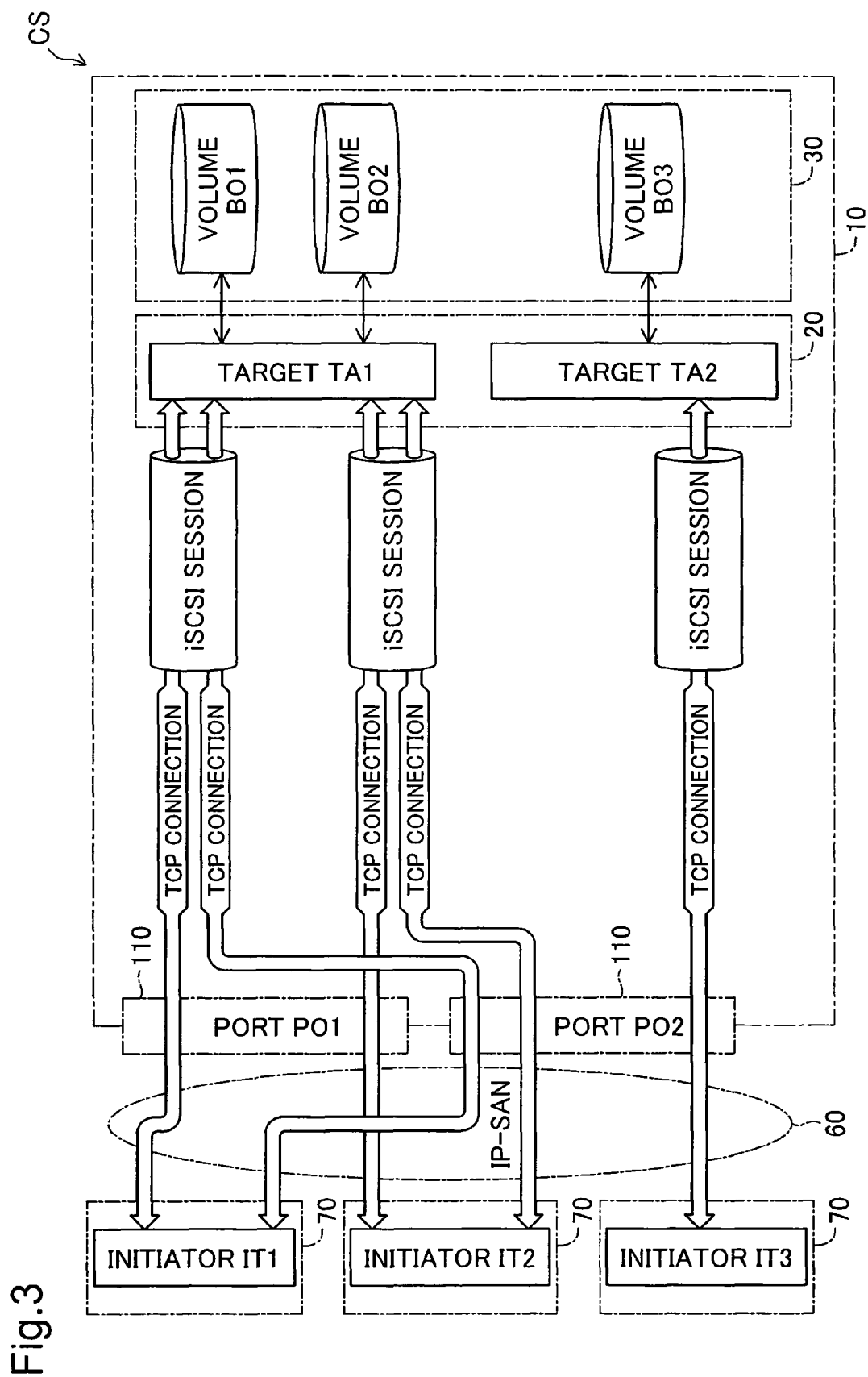
FIG. 3 illustrates the logical structure of the electronic computer system CS.

A(2). Logical Structure of Electronic Computer System CS:

FIG. 3 illustrates the logical structure of the electronic computer system CS. In the electronic computer system CS, the initiator computers 70 logically construct iSCSI initiators, and the target computer 20 of the storage system 10 logically constructs iSCSI targets. In the examples shown in FIG. 3, three initiators IT1 through 3 are logically constructed as iSCSI initiators on the three initiator computers 70, and two targets TA1, TA2 are logically constructed as iSCSI targets on the target computer 20 of the storage system 10.

FIG. 4 illustrates an example of a target configuration table 4000. The target configuration table 4000 in FIG. 4 is data for configuring the assignment of the volumes in the storage unit 30 to the iSCSI targets of the target computer 20, and is stored in the RAM 214 of the target computer 20. The target configuration table 4000 includes target name data 4010 for identifying the iSCSI targets constructed in the storage system 10, volume name data 4020 for identifying the volumes constructed in the storage system 10, and storage capacity data 4030 giving storage capacity assigned to each volume. In the example in FIG. 3, based on the target configuration table 4000 in FIG. 4, the three volumes BO1 through 3 each have 10 gigabytes of storage capacity, and volumes BO1, 2 are assigned to target TA1, and volume BO3 is assigned to target TA2.

FIG. 5 illustrates an example of a path configuration table 5000. The path configuration table 5000 in FIG. 5 is data for configuring iSCSI sessions between the iSCSI initiators of the initiator computers 70 and the iSCSI targets of the target computer 20, and is stored in RAM 214 of the target computer 20. The path configuration table 5000 comprises target name data 5010 for identifying the iSCSI targets constructed in the storage system 10, initiator name data 5020 for identifying the iSCSI initiators permitted iSCSI sessions with the iSCSI targets, initiator address data 5030 giving the IP addresses for the iSCSI initiators, IP port name data 5040 identifying the IP ports 110 as data communication paths utilized to establish TCP connections between the iSCSI initiators and iSCSI targets, TCP port number data 5050 used for the TCP connections, and authentication information data 5060 utilized for authenticating the iSCSI initiators. In this embodiment, the sixteen IP ports 110 are each assigned ports PO1 through 16 as an IP port name. In the example shown in FIG. 3, based on the path configuration table 5000 in FIG. 5, ports PO1 and 2 are assigned as the data communication paths between the target TA1 and the initiators IT1 and 2, and port PO2 is also assigned as the data communication path between the target TA2 and the initiator IT3.

Figure 6:
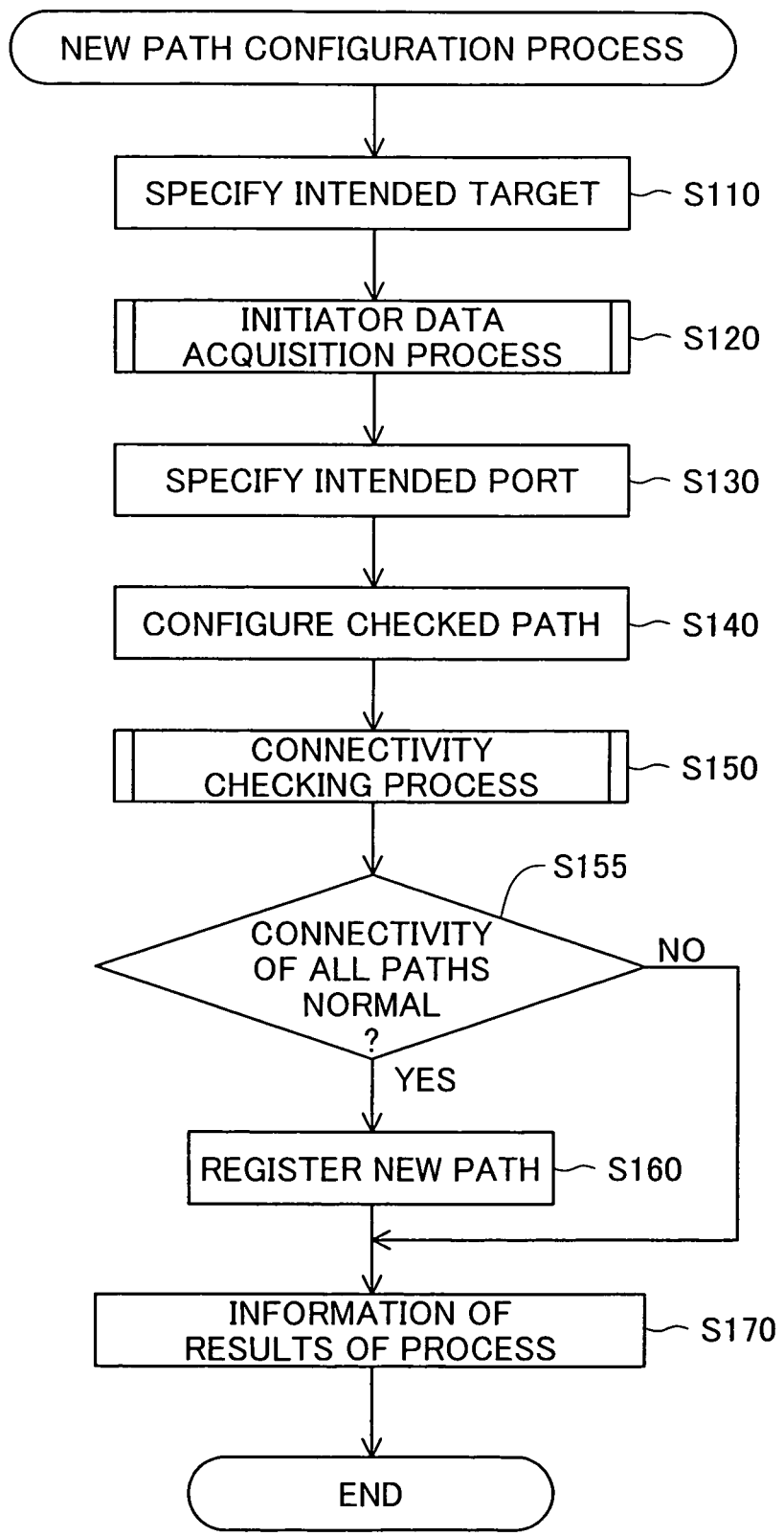
FIG. 6 is a flowchart of a new path configuration process.

B. Operation of Electronic Computer System CS:

B(1). Process for Checking Connectivity of New Path:

FIG. 6 is a flowchart of a new path configuration process. The new path configuration process is a process for configuring a new path, which is a newly configured data communication path, to the path configuration table 5000 in FIG. 5. In this example, the new path configuration process is executed by operations of the CPU 210 based on software in the target computer 20. In this example, the target computer 20 starts the new path configuration process based on a command input by the administrator via the management terminal 15.

When the target computer 20 starts the new path configuration process shown in FIG. 6, the target computer 20 specifies an intended target which is the iSCSI target intended for configuring the new path (Step S110). In this example, the target computer 20 specifies the iSCSI target indicated by the administrator via the management terminal 15 as the intended target.

After the target computer 20 has specified the intended target (Step S110), the target computer 20 executes an initiator data acquisition process (Step S120). The initiator data acquisition process is a process for acquiring initiator data for an intended initiator which is the iSCSI initiator indicated for configuring the new path with the intended target, such as data identifying the intended initiator, and the initiator address which is the IP address indicating the location of the intended initiator on the IP-SAN 60. Details on the initiator data acquisition process are given below.

After the target computer 20 has executed the initiator data acquisition process (Step S120), the target computer 20 specifies an intended port which is the IP port 110 intended for configuring the new path between the intended target and the intended initiator (Step S130). In this example, the target computer 20 specifies the IP port 110 indicated by the administrator via the management terminal 15 as the intended port.

After the target computer 20 has specified the intended IP port (Step S130), the target computer 20 configures the new path connecting the intended initiator and intended target through the intended port as a checked path to check the connectivity (Step S140). The target computer 20 then executes an connectivity checking process which is a process for checking the connectivity of the configured checked path (Step S150).

Figure 7:
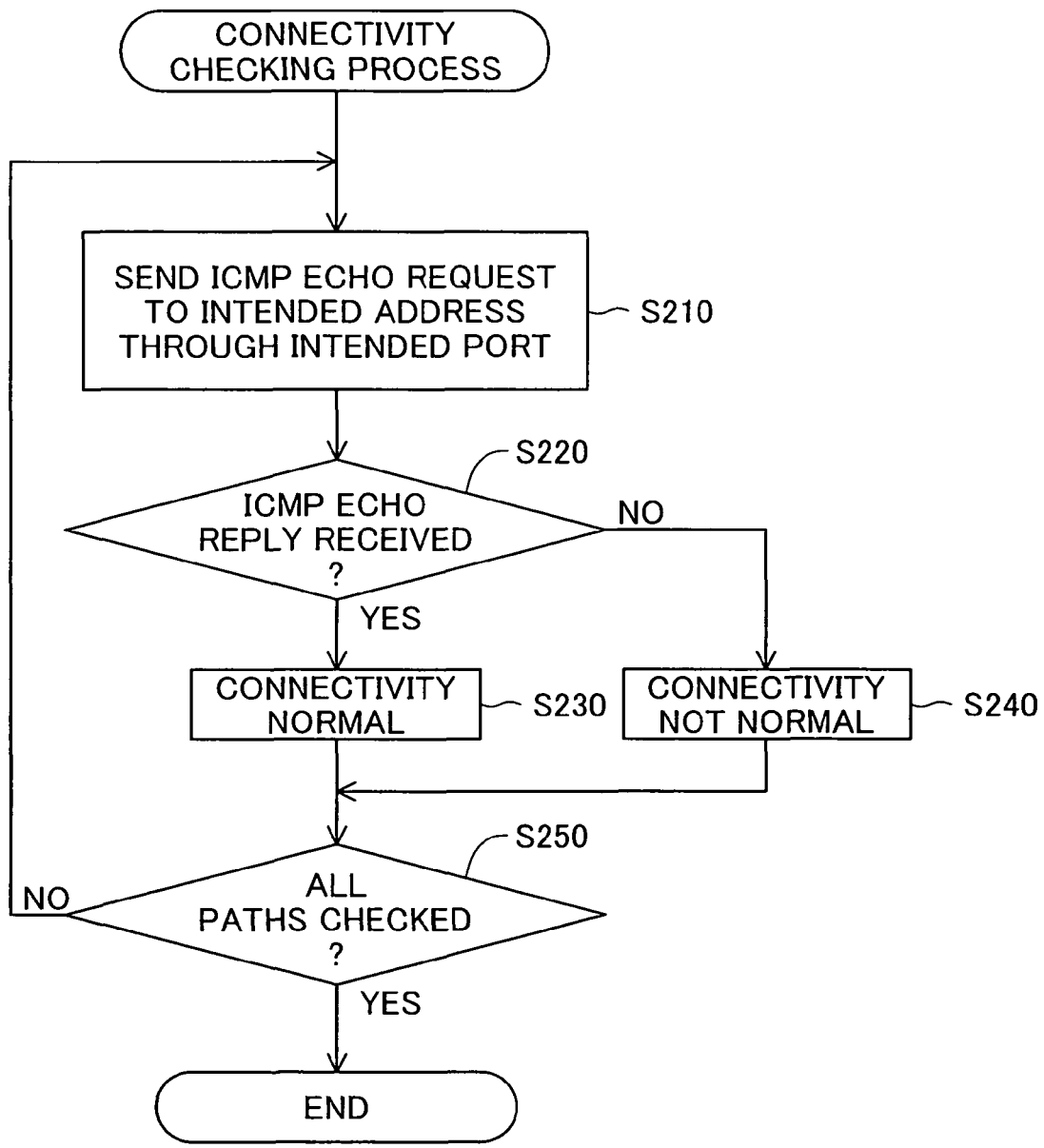
FIG. 7 is a flowchart of a connectivity checking process.

FIG. 7 is a flowchart of a connectivity checking process. When the target computer 20 starts the connectivity checking process, the target computer 20 sends the ICMP echo request to an intended address, which is the initiator address of the intended initiator, through the intended port by executing a command of the ping which has been installed as an application (Step S210). The target computer 20 then determines whether or not an ICMP echo reply has been received in response to the sent ICMP request (Step S220). The target computer 20 determines that the connectivity of the checked path is normal when the ICMP echo reply has been received (Step S230). If, on the other hand, a prescribed time has elapsed since the transmission of the ICMP echo request, and the ICMP echo reply has timed out, so that no ICMP echo reply can be received, the target computer 20 determines that the connectivity of the checked path is not normal (Step S240). When the connectivity of all connectivity checking paths has been checked (Step S250), the connectivity checking process is complete. When the ICMP echo reply has timed out, the target computer 20 may try to send an ICMP echo request again to determine whether or not an ICMP echo reply is received. When the ICMP echo request does not reach the address, the target computer 20 can determine the reason for the connectivity malfunction by receiving an ICMP message indicating the cause of the error, such as excessive time or failure to reach the address, sent from the IP switches 610 in the path.

Figure 8:
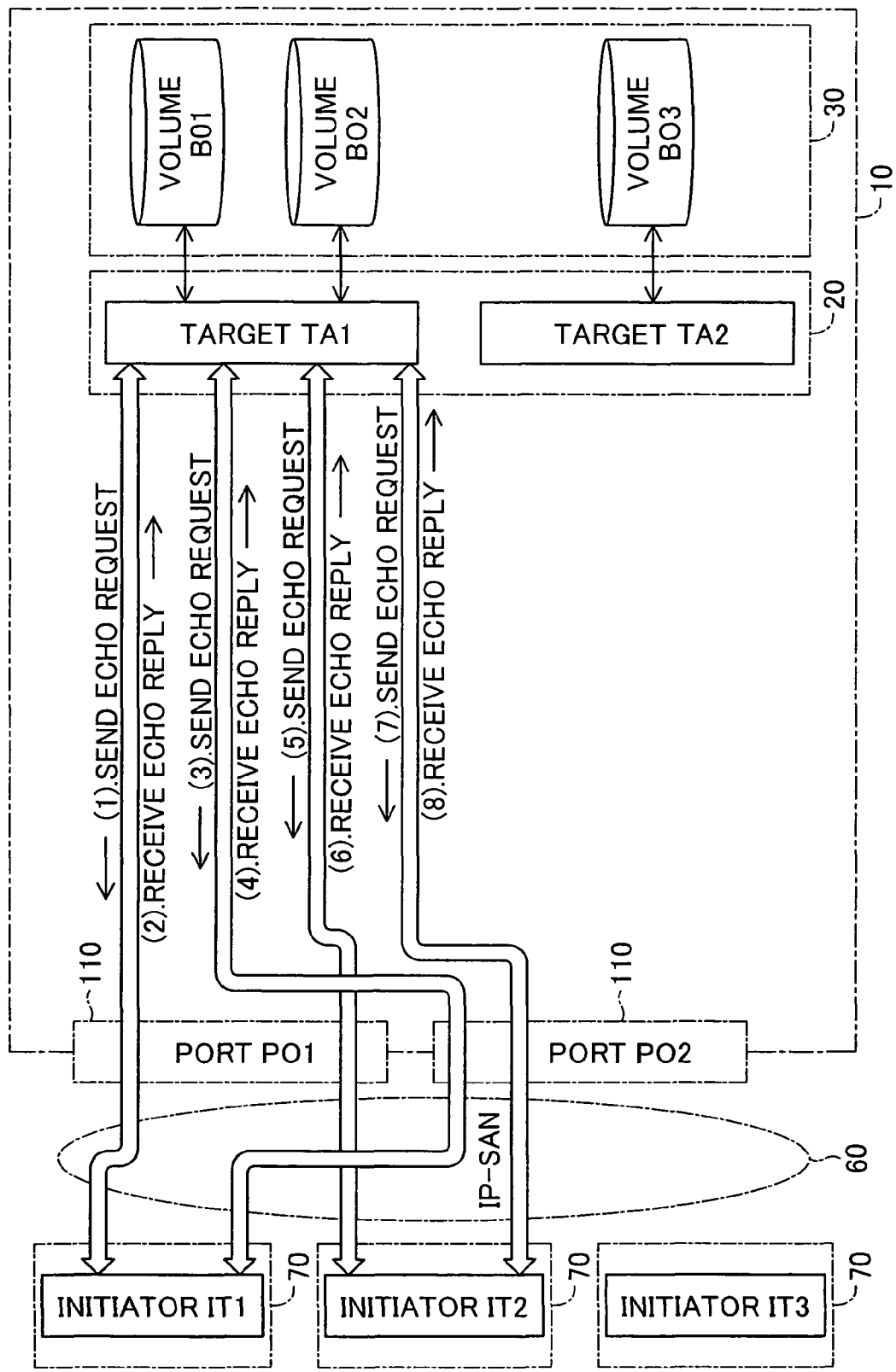
FIG. 8 illustrates an example of the connectivity checking process.

FIG. 8 illustrates an example of a connectivity checking process. The example in FIG. 8 illustrates a connectivity checking process when the target computer 20 configures the path related to the target TA1 of the path configuration table 5000 in FIG. 5 as the checked path. In the path in FIG. 8, the target computer 20 sends the ICMP echo requests and receives the ICMP echo replies to determine the connectivity of each checked path, such as the path between the target TA1 and the initiator IT1 through port PO1, the path between the target TA1 and the initiator IT1 through port PO2, the path between the target TA1 and the initiator IT2 through port PO1, and the path between the target TA1 and the initiator IT2 through port PO2.

Returning to the description of the new path configuration process in FIG. 6, when the target computer 20 has completed the connectivity checking process in FIG. 7 (Steps S150) and then determines that the connectivity of all checked paths is normal (Step S155), the target computer 20 registers the new path to the path configuration table 5000 in FIG. 5 (Step S160). No new path can be registered unless the connectivity is normal. The target computer 20 then informs the administrator of the results of the new path configuration process by the management terminal 15 (Step S170).

FIG. 9 illustrates an example of the information of the new path configuration process. FIG. 9 illustrates a results display window WD1 which is displayed on the display 16 of the management terminal 15 as the results obtained in the new path configuration process. The results display window WD1 displays information as to whether or not the connectivity of each checked path is normal. When the connectivity is not normal, the reason for the abnormality determined from the ICMP message showing the cause of the error is displayed. The target computer 20 issues the information of results (Step S170), and the new path configuration process is complete.

Figure 10:
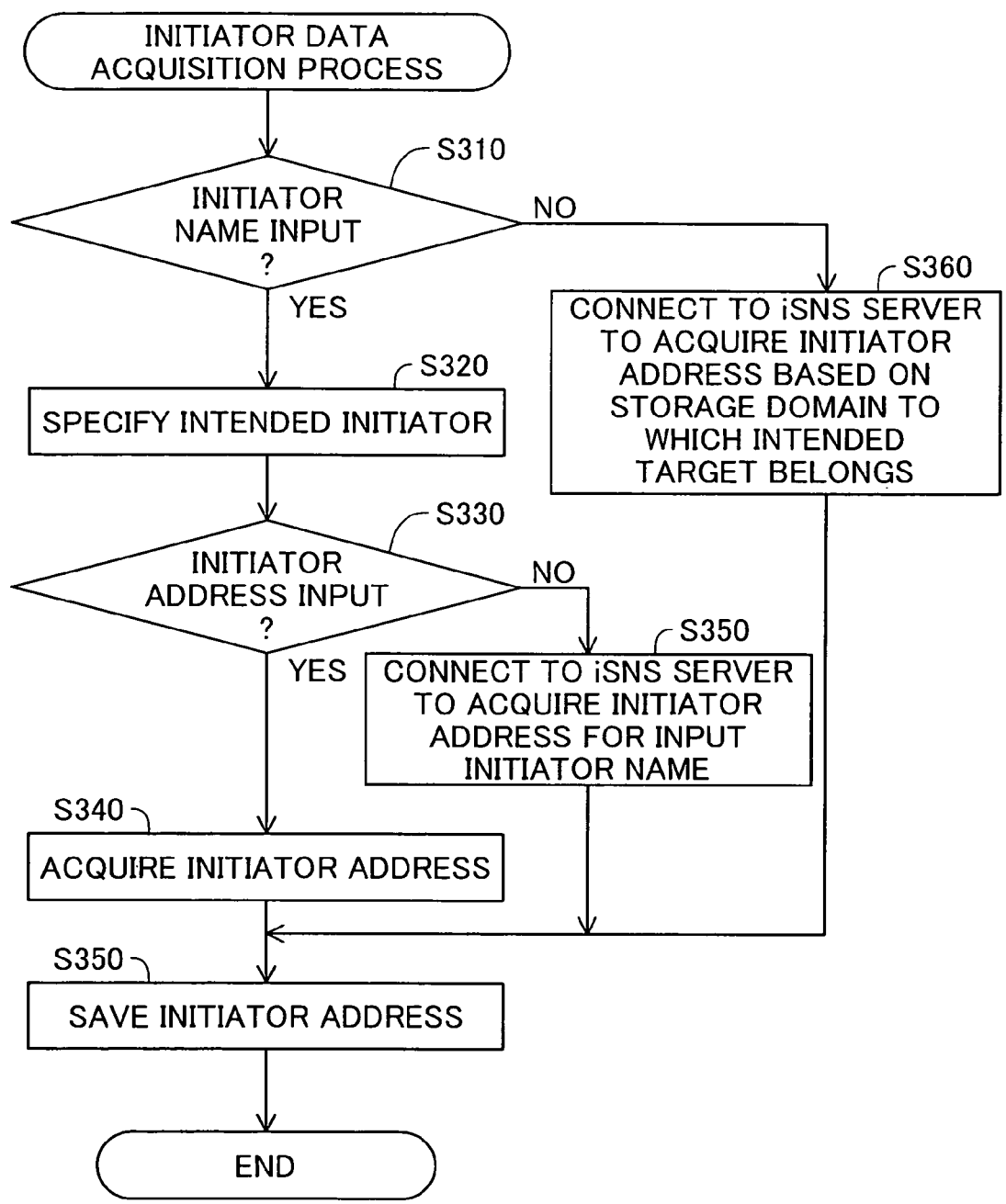
FIG. 10 is a flowchart of an initiator data acquisition process.

FIG. 10 is a flowchart of the initiator data acquisition process. The initiator data acquisition process is executed by the new path configuration process in FIG. 6 (Step S120 in FIG. 6), and is a process for acquiring initiator data for the intended initiator. When the initiator name capable of identifying the iSCSI initiator and the initiator address are input by the administrator via the management terminal 15, the target computer 20 specifies the iSCSI initiator indicated by the administrator as the intended initiator, and acquires the initiator address input by the administrator (Steps S320, S340).

When, on the other hand, the initiator name is not input, or when the initiator address is not input, the target computer 20 is connected through the IP-SAN 60 to the iSNS server 50, and obtains the necessary data from the iSNS server 50. FIG. 11 illustrates an example of a storage domain table 11000. FIG. 12 illustrates an example of an initiator address table 12000. The storage domain table 11000 in FIG. 11 is data by which a storage domain relating to the iSCSI target of the storage system 10 is configured. The storage domain table 11000 comprises storage domain name data 11010 for identifying the storage domain, node name data 11020 for identifying nodes included in the storage domain, and attribute data 11030 indicating whether the nodes are either initiators or targets. The initiator address table 12000 in FIG. 12 is data by which the initiator addresses of the iSCSI initiators registered in the storage domain table 11000 are registered. The initiator address table 12000 comprises initiator name data 12010 for the iSCSI initiators, and initiator address data 12020 of the iSCSI initiators. In this example, the storage domain table 11000 and the initiator address table 12000 are registered by the administrator through the management terminal 55 to the iSNS server 50.

When no initiator names are input by the administrator (Step S310), the target computer 20 presents the intended targets to the iSNS server 50, so that the target computer 20 specifies the intended initiators which is the iSCSI initiators defined in the storage domain table 11000 as the combinations with the intended targets, and acquires the initiator addresses of the specified intended initiators stored in the initiator address table 12000 from the iSNS server 50 (Step S360).

When the initiator names have been input by the administrator but the initiator addresses have not been input (Step S330), the target computer 20 presents the intended initiators to the iSNS server 50, so that the target computer 20 acquires the initiator addresses of the presented intended initiators stored in the initiator address table 12000 from the iSNS server 50 (Step S350).

After the intended initiators have been specified, and the initiator addresses have been acquired (Steps S320, S340, S350, and S360), the target computer 20 saves the initiator addresses in relation to the initiator names in RAM 214 or other internal storage (not shown) (Step S350), and the initiator data acquisition process is complete.

Figure 13:
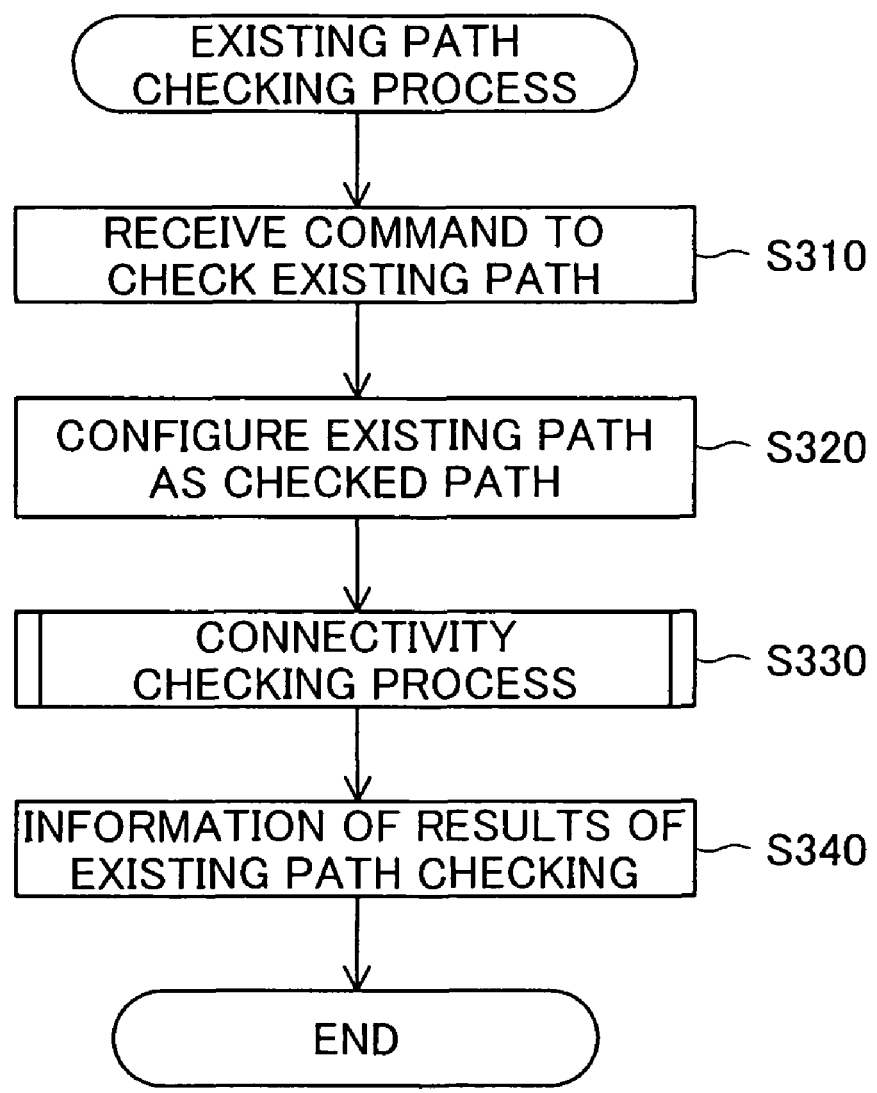
FIG. 13 is a flowchart of an existing path checking process.

B(2). Process for Checking Connectivity of Existing Path:

FIG. 13 is a flowchart of an existing path checking process. The existing path checking process is a process for checking the connectivity of existing paths which are data transfer paths already in existence, and is executed by operations of the CPU 210 based on software in the target computer 20.

The target computer 20 starts the existing path checking process when the target computer 20 receives a command for starting the process from the administrator via the management terminal 15 (Step S310), and the target computer 20 configures the existing paths configured in the path configuration table 5000 in FIG. 5 as the checked paths to check connectivity (Step S320). After the connectivity checking process shown in FIG. 7 (Step S330), the target computer 20 then informs the administrator of the results of the existing path checking process by the management terminal 15 (Step S340). FIG. 14 illustrates an example of the information of the existing path checking process. FIG. 14 illustrates a results display window WD2 that is displayed on the display 16 of the management terminal 15 as information of the results of the existing path checking process. The results display window WD2 displays information as to whether or not the connectivity is normal in each path checked for connectivity. When the connectivity is not normal, the reason for the abnormality determined from the ICMP message giving the cause of the error is displayed. The target computer 20 issues the information of results (Step S340), and the existing path checking process is complete.

Figure 15:
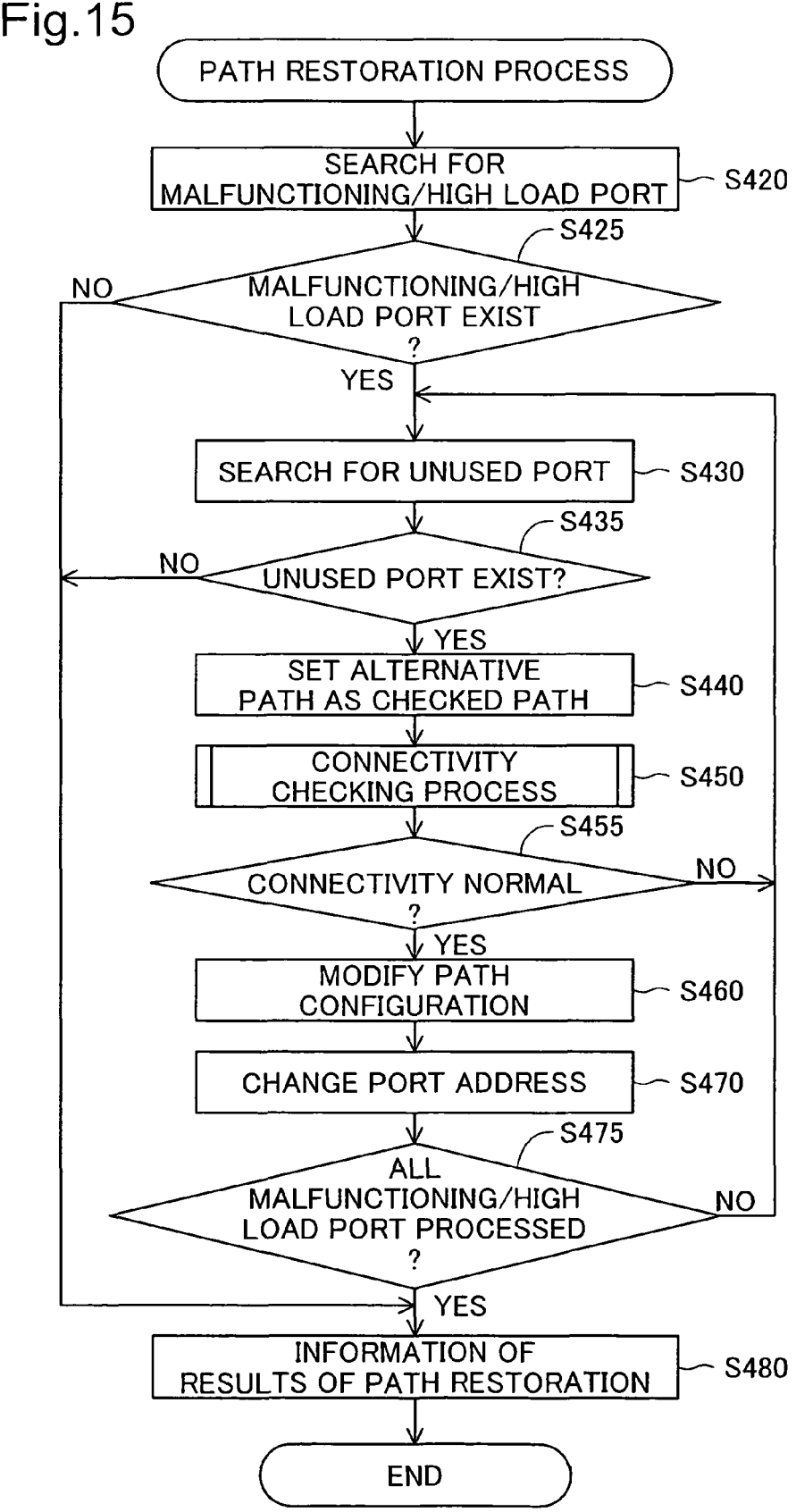
FIG. 15 is a flowchart of a path restoration process.

B(3). Process for Path Restoration During Malfunction or High Load:

FIG. 15 is a flowchart of a path restoration process. The path restoration process is for restoring paths which have become difficult to use due to malfunctions or high loads. In this embodiment, the process is executed by operations of the CPU 210 based on software in the target computer 20. In this embodiment, the target computer 20 repeats the path restoration process at prescribed time intervals.

When the target computer 20 starts the path restoration process, the target computer 20 searches ports with malfunctions or high loads among the IP ports 110 for which paths have been configured in the path configuration table 5000 in FIG. 5 (Step S420). FIG. 16 illustrates an example of an IP port communication statistic table 16000. The IP port communication statistic table 16000 is data on the connectivity and load rates recorded by the target computer 20 for all IP ports 110 of the storage system 10. The IP port communication statistic table 16000 is stored in the RAM 214 of the target computer 20. The IP port communication statistic table 16000 comprises IP port name data 16010 for each of the IP ports 110, connectivity data 16020 for each of the IP ports 110, and load rate data 16030 for each of the IP ports 110. The target computer 20 searches for malfunctioning/high load ports by referencing the IP port communication statistic table 16000 stored in RAM 214. In this embodiment, connectivity blockage is determined to be a malfunctioning port, and a load rate over 80% is determined to be a high load port.

When there is a malfunctioning/high load port (Step S425), the target computer 20 references the IP port communication statistic table 16000 in FIG. 16 to search for unused ports for which no path has been configured in the path configuration table 5000 in FIG. 5 from among the IP ports 110 other than the malfunctioning/high load ports (Step S430).

When there are unused ports (Step S435), alternative paths for which the malfunctioning/high load ports of existing paths have been replaced with unused ports are configured by the target computer 20 as connectivity paths to check the connectivity based on existing paths using malfunctioning/ high load ports (Step S440). When the connectivity checking process in FIG. 7 has been run (Step S450) and the connectivity of the checked path is normal (Step S455), the target computer 20 then registers the alternative path instead of the existing path using the malfunctioning/high load port to the path configuration table 5000 in FIG. 5, so as to modify the existing path to the alternative path (Step S460).

FIG. 17 illustrates an example of a port address table 17000. The port address table 17000 is data in which are recorded the port addresses of the sixteen IP ports 110 in the storage system 10, and is stored in RAM 214 of the target computer 20. The port address table 17000 comprises IP port name data 17010 for each of the ports 110, and port address data 17020 assigned to each of the IP ports 110. After the existing path has been modified to the alternative path (Step S460), the target computer 20 changes the port addresses assigned to the old IP ports 110 that need to be changed to the new replacement IP ports 110, and rewrites the port address table 17000 in FIG. 17 (Step S470).

When all of the malfunctioning/high load ports have been processes (Step S475), the target computer 20 informs the administrator of the results of the path restoration process by the management terminal 15 (Step S480). FIG. 18 illustrates an example of information of the path restoration process. FIG. 18 shows a results display window WD3 displayed on the display 16 of the management terminal 15 as the information of the results of the path restoration process. The results display window WD3 displays messages that the communication state for the existing paths using malfunctioning/ high load ports is good, messages that alternative paths and modified paths have been configured, and messages on paths which could not be changed to alternative paths. After the target computer 20 issues the results of the path restoration process (Step S480), the path restoration process is complete.

According to the storage system 10 of the present invention described above, it can be determined on the storage system 10 side whether or not the connectivity of the data communication paths is normal by the ICMP echo request from the target computer 20 on the storage system 10 side. It is therefore possible to make it easier to check the connectivity of data communication paths without any need for attempting access from the initiator computer 70 side in order to check connectivity.

The new path configuration process in FIG. 6 also makes it easier to check connectivity when configuring new data communication paths. The administrator of the storage system 10 can easily check the connectivity of existing data communication paths by the existing path checking process in FIG. 13, making it easier to administer the storage system 10. When the IP ports 110 configured as data communication paths malfunction or become highly loaded, the path restoration process in FIG. 15 enables a rapid move to data communication paths with good communications states. Port addresses can also be changed (Step S470 in FIG. 15) to restore data communication paths without the need for changing communication configuration of the initiator computer 70 side.

C. Other Embodiments

Figure 19:
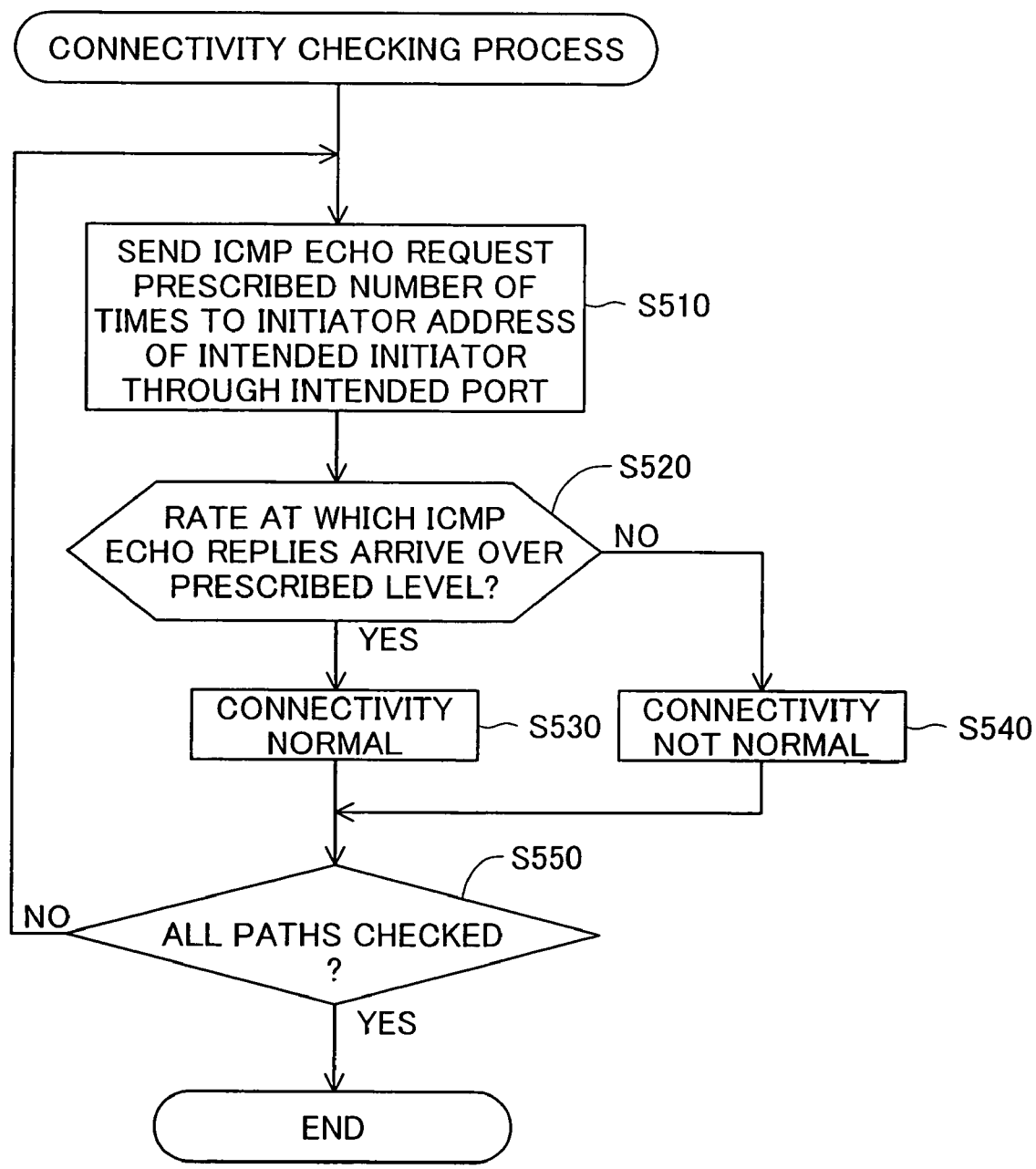
FIG. 19 is a flowchart of another embodiment of the connectivity checking process.

Embodiments of the invention were described above, but the invention is not limited to those examples, and is capable of various modifications within the scope of the invention. For example, in the connectivity checking process in FIG. 7, it is determined whether or not the connectivity is normal based on whether or not an ICMP echo reply is received, but it may also be determined whether or not connectivity is normal by the rate at which ICMP echo replies arrive. FIG. 19 is a flowchart of another embodiment of a connectivity checking process. In the connectivity checking process in FIG. 19, the target computer 20 issues plurality of ICMP echo requests (Step S510), and then determines whether or not the rate at which ICMP echo replies reach the target computer 20 is over a prescribed level (Step S520). When the rate at which ICMP echo replies arrive is over the prescribed level, the target computer 20 determines the path connectivity to be normal (Step S530). When the rate at which ICMP echo replies arrive is not over the prescribed level, the target computer 20 determines the path connectivity to not be normal (Step S540). In this embodiment, the prescribed level for the rate as the criteria for determining connectivity is 90%, but this value can be modified according to the embodiment. The process for checking connectivity in the other embodiment in FIG. 19 can prevent paths with excessive communications loads from being determined to be normal.

Figure 22:
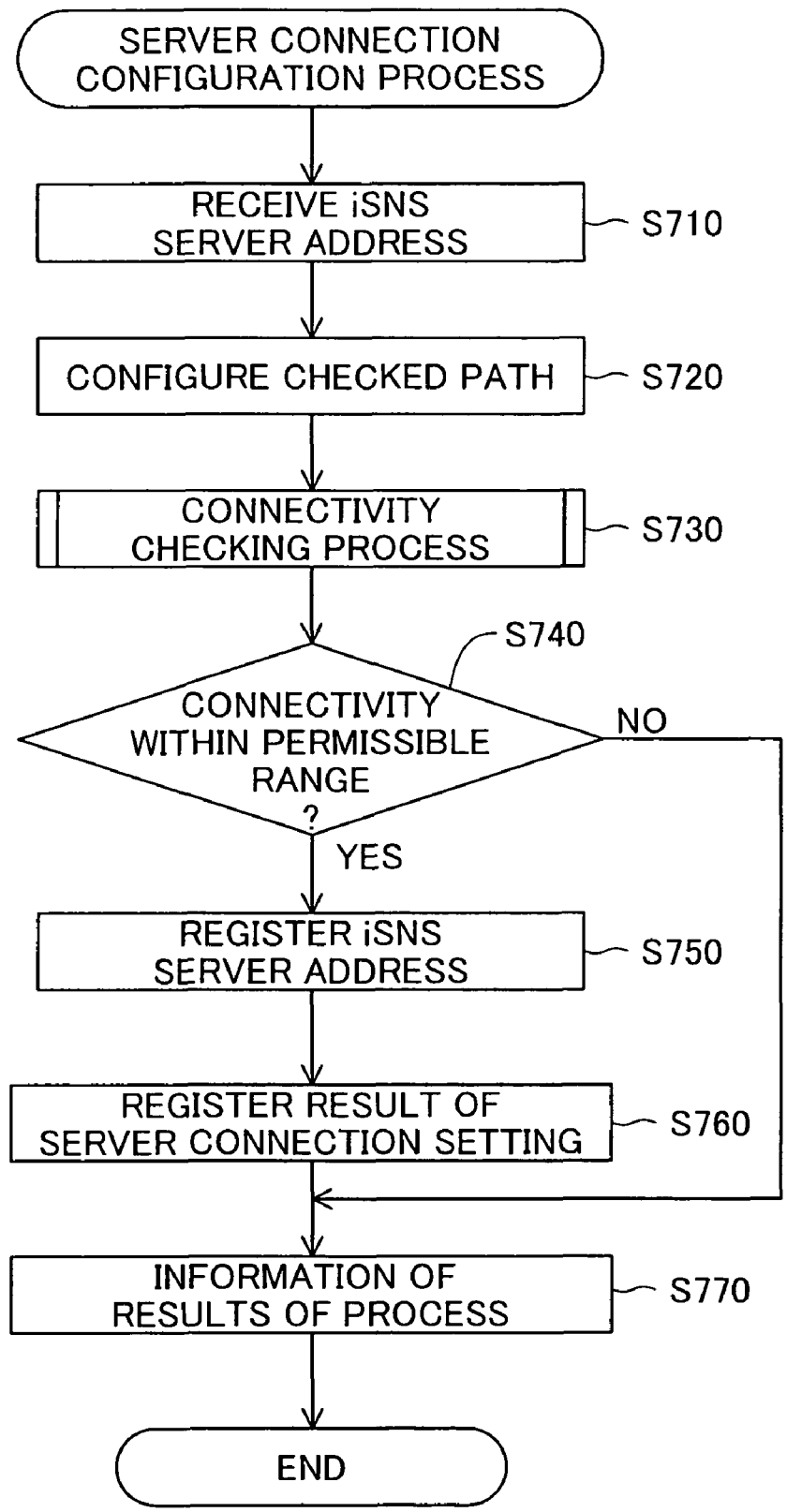
FIG. 22 is a flowchart of a server connection configuration process.
Figure 23:
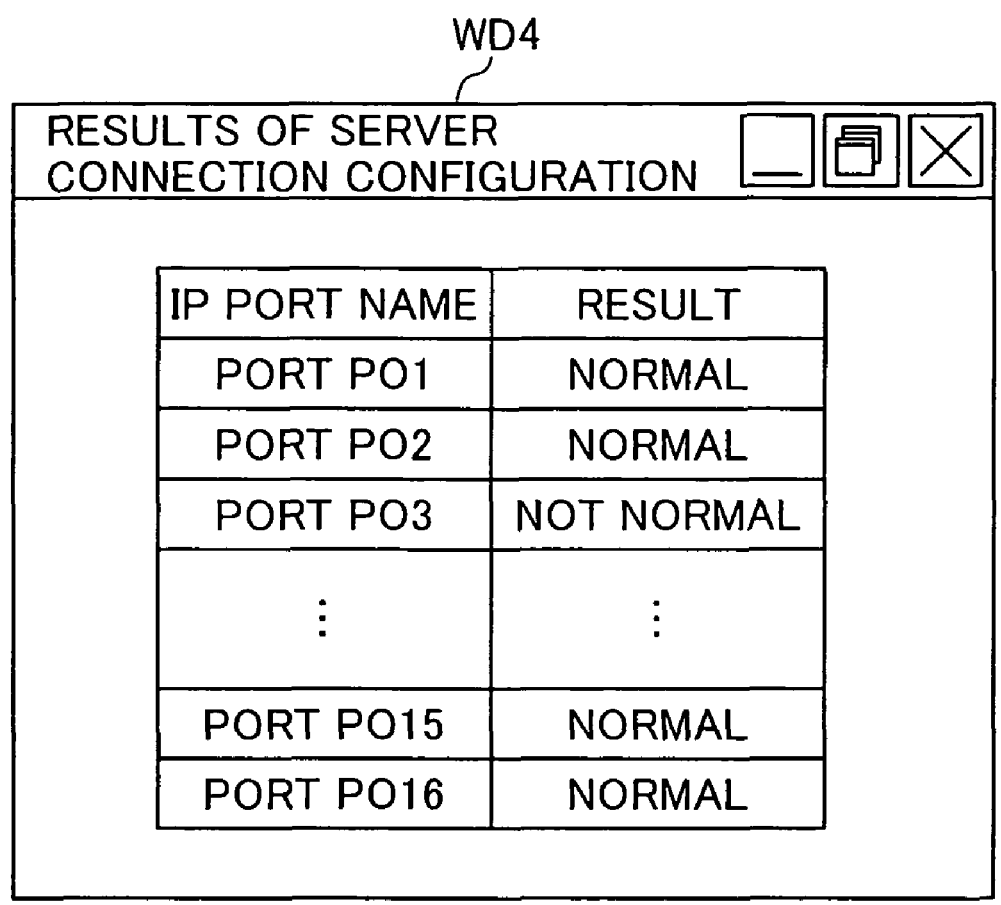
FIG. 23 illustrates an example of information of the server connection configuration process.

When communications are configured with the iSNS server 50 through the IP-SAN 60 in the storage system 10, the target computer 20 may execute the connectivity checking process in FIG. 7 or 19 for the data communication path with the iSNS server 50. At that time, the target computer 20 may execute the connectivity checking process on paths with the iSNS server 50 through all the IP ports 110. FIG. 22 is a flowchart of a server connection configuration process. The server connection configuration process in FIG. 22 is run when the iSNS server address which is the IP address of the iSNS server 50 is registered by the target computer 20. The target computer 20 receives the iSNS server address input by a user through the management terminal 15 (Step S710), and paths to the iSNS server 50 through the all IP ports 110 are configured as connectivity checking paths (Step S720), and the connectivity checking process in FIG. 7 or 19 is run (Step S730). The target computer 20 then determines whether or not the results for the connectivity of the ports 110 in the connectivity checking process are within an acceptable range in terms of registering the iSNS server address (Step S740). In this embodiment, the criteria for determining that the results are within the acceptable range is that the connectivity of more than half of all the IP ports 110 is normal, but the criteria can be established as desired. It may be configured that the connectivity in all of the IP ports 110 should be normal in order to permit registration. When the results of the connectivity are determined to be within the acceptable range (Step S740), the target computer 20 registers the iSNS server address and connectivity results in prescribed tables stored in RAM 14 (Steps S750 and S760), and issues information of the results of the server connection configuration process (Step S770). FIG. 23 illustrates an example of the information of the server connection configuration process. FIG. 23 shows a results display window WD4 displayed on the display 16 of the management computer 15 as information of the results of the server connection configuration process. The results display window WD4 displays the results for the connectivity of the paths with the iSNS server 50 through the IP ports 11. If it is determined that the results for connectivity are not within the acceptable range (Step S740), a message that the iSNS server addresses are not registered may be displayed.

Based on the ICMP protocol stored in ROM 212 of the target computer 20, the program for diagnosing the IP network may be by "trace route" or "tracert", not just "ping". In this embodiment, the storage unit 30 comprises a plurality of HDD 310, but the storage unit 30 may also be comprises other types of storage, such as optical disk storage, semiconductor memory, or magnetic tape drives.

Figure 20:
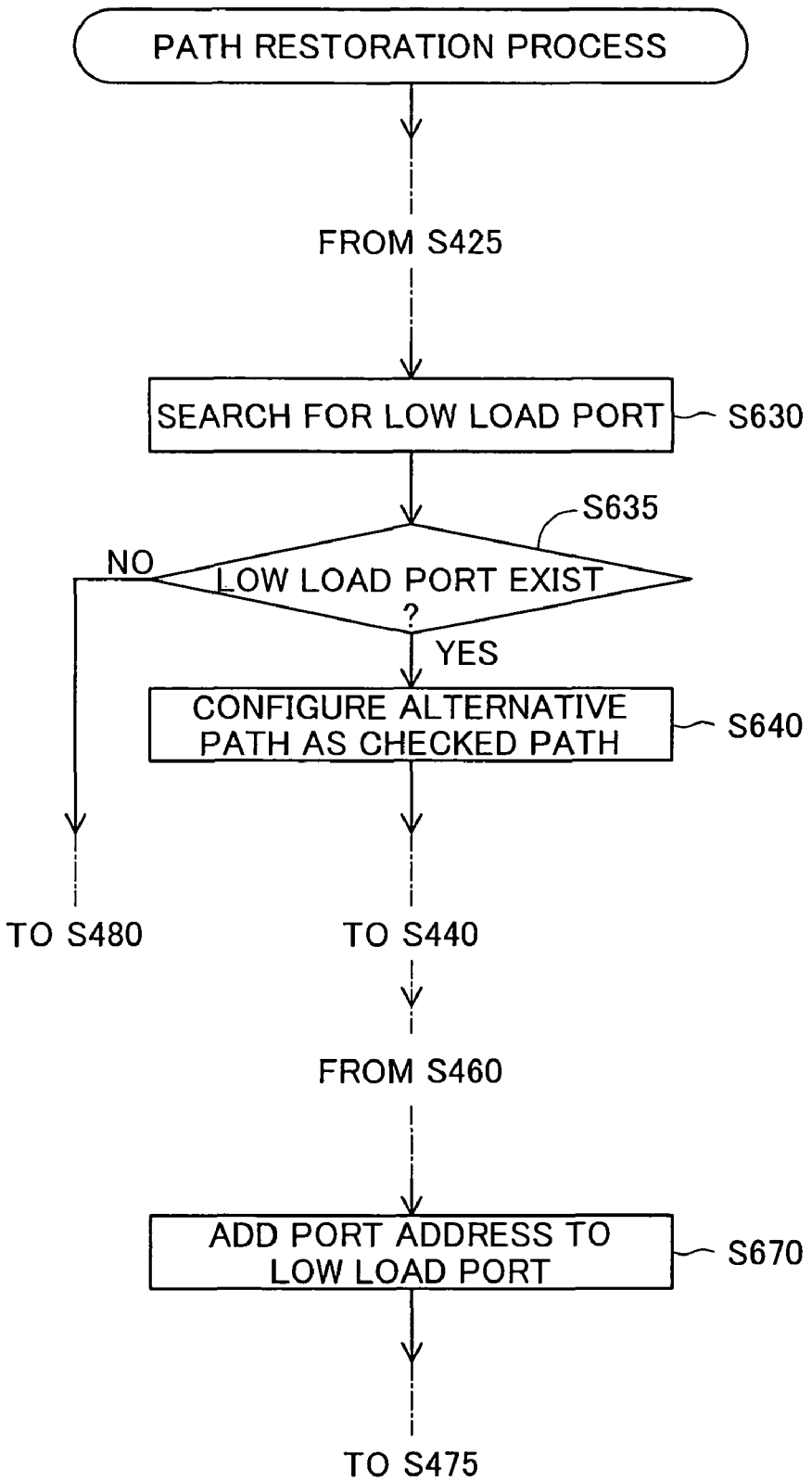
FIG. 20 is a flowchart of another embodiment of the path restoration process.

In the path restoration process in FIG. 15, the port addresses of malfunctioning ports or high load ports were replaced with unused ports to restore paths, but paths may also be restored by assigning a plurality of port addresses to one IP port 110, for example. FIG. 20 is a flowchart of a path restoration process in another embodiment. FIG. 21 illustrates a port address table for the other embodiment. In the path restoration process in FIG. 20, the target computer 20 references the IP port communication statistic table 16000 in FIG. 16 instead of searching for unused ports (Step S430 in FIG. 15), so as to search for low load ports with load rates that are not over a prescribed level among the IP ports 110 other than malfunctioning and high load ports (Step S630). In this embodiment, a port is determined to be low load when the load rate is not over 40%. When a low load port is available (Step S635), the paths configured by the target computer 20 to check the connectivity (Step S640) are alternate paths in which the malfunctioning or high load ports of existing paths are replaced by low load ports based on existing paths utilizing malfunctioning or high load ports. When the connectivity is normal in the subsequent process for checking connectivity (Step S450 in FIG. 15), the target computer 20 adds the port addresses assigned to the malfunctioning or high load ports to the low load port, and rewrites the port address table 21000 in FIG. 21 (Step S670). The port address table 21000 in FIG. 21 comprises IP port name data 21010 for each IP port 110, and post addresses 21020, 21030, and 21040 assigned to the IP ports 110. In the example of the port address table 21000 in FIG. 21, up to three port addresses can be assigned per IP port 110, but the number of port addresses which can be assigned per IP port 110 is not limited to 3, and can be increased as needed according to the embodiment. When the load of an IP port 110 assigned a plurality of port addresses increases, some of the plurality of port addresses may be canceled. The path restoration process in FIG. 20 allows the load to be distributed across several IP ports 110.

Figure 24:
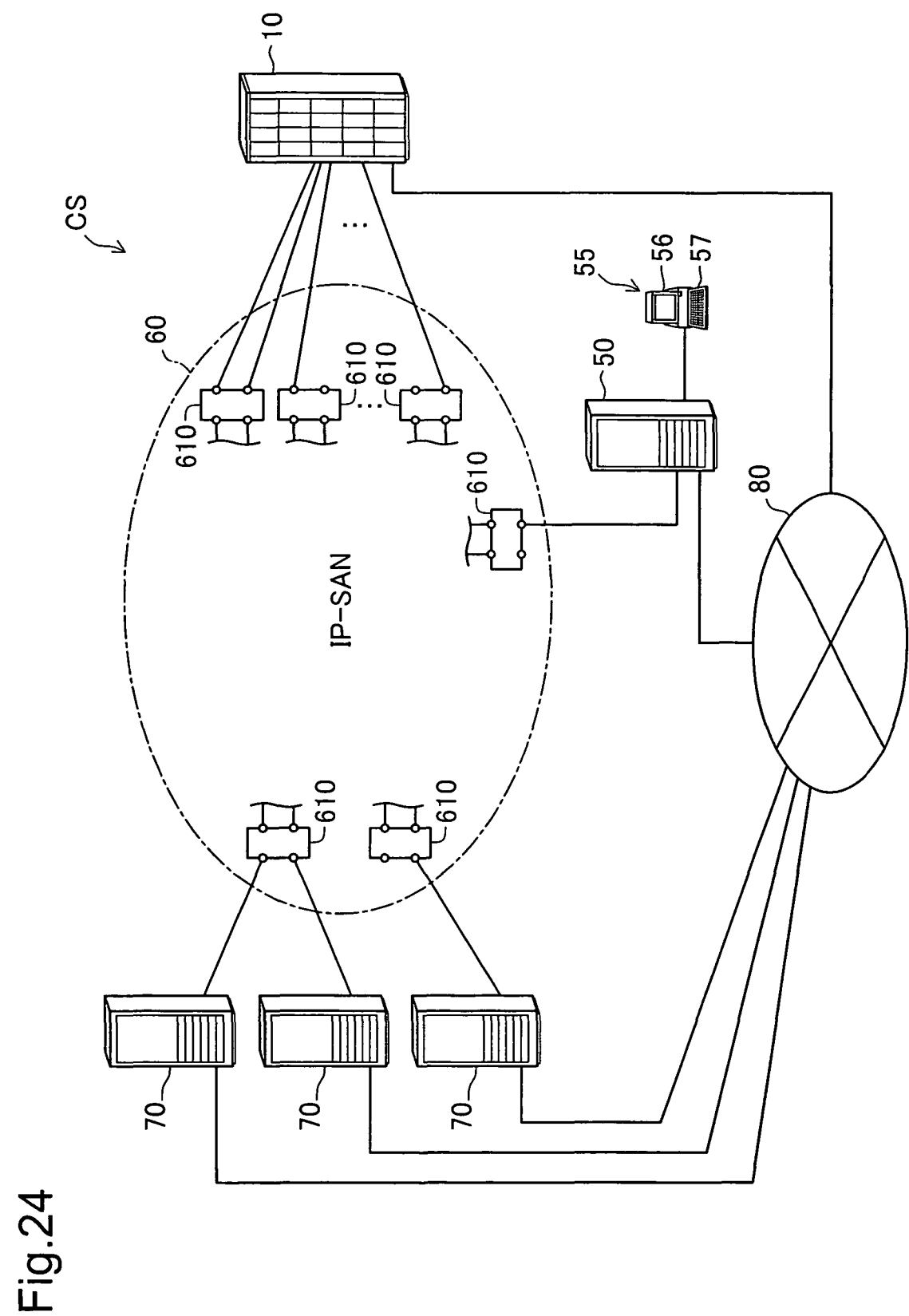
FIG. 24 illustrates the physical structure of the electronic computer system CS in another embodiment.

A variety of connection modes can be used between the various devices, such as the storage system 10, the initiator computers 70, and iSNS server 50, not just that shown in embodiment in FIG. 1. In addition to connections with the IP-SAN 60, for example, the various devices such as the storage system 10, the initiator computers 70, and iSNS server 50 may be connected by an out-of-band network independent from the IP-SAN 60 so as to avoid IP-SAN 60 traffic. FIG. 24 illustrates the physical structure of the electronic computer system CS in another embodiment. In the example of the connection mode in FIG. 24, the storage system 10, initiator computers 70, and iSNS server 50 are connected through an out-of-band network 80 that is different from the IP-SAN 60. The various set ups in the storage system 10 and initiator computers 70 are done through the management network 80 by the iSNS server 50. Additionally, in the connection mode in FIG. 24, the management terminal 15 may be connected to the storage system 10, and the various set ups of the storage system 10 may be done by the iSNS server 50 and the management terminal 15. The connectivity of the paths between the various devices in the management network 80 may be checked in the same manner as the connectivity checking processes in FIG. 17 or 19.

All changes within the meaning and range of equivalency of the claims are intended to be embraced therein. The scope and sprit of the present invention are indicated by the appended claims, rather than by the foregoing description.

What is claimed is:

1. A connectivity checking method for checking connectivity between a plurality of initiator computers and a plurality of target computers in a storage system, said storage system comprising a plurality of connecting ports for connecting to an Internet Protocol network, and said target computers providing prescribed storage volumes via any of said plurality of connecting ports to said initiator computers connected to said network, said connectivity checking method comprising:

configuring at least one data communication path between said target computers and said initiator computers via said connecting ports, and for each said at least one data communication path, storing in a path configuration table a target name that identifies a target computer of the plurality of target computers, an initiator name that identifies an initiator computer of the plurality of initiator computers, and a port name that identifies a prescribed connecting port of the plurality of connecting ports;

transmitting an echo request based on an Internet Control Message Protocol from said target computer identified by said stored target name to said initiator computer identified by said stored initiator name via said prescribed connecting port identified by said stored port name of said at least one communication path;

determining said connectivity via said at least one data communication path having said prescribed connecting port based on a reachable status of an echo reply in said target computer, said echo reply being transmitted from said initiator computer in response to said transmitted echo request;

configuring a new data communication path between said initiator computer and said target computer via a connecting port other than said prescribed connecting port;

checking connectivity for said new data communication path; and registering said new data communication path in said path configuration table if it is determined that said connectivity via said new data communication path is normal.

2. The connectivity checking method according to claim 1, wherein said prescribed connecting port is a prescribed first connecting port of a first data communication path of said at least one data communication path, wherein said prescribed first connecting port of said first data communication path of said at least one data communication path is different from a second connecting port configured for a second data communication path between said initiator computer and said target computer, and wherein said connectivity checking method further comprises:

when a communication malfunction occurs in said configured second connecting port of said second communication path, and when it is determined that said connectivity via said prescribed first connecting port is normal, modifying a configuration of said second data communication path to substitute said prescribed first connecting port for said configured second connecting port in said path configuration table.

3. The connectivity checking method according to claim 2, further comprising:

assigning a port address assigned to said configured second connecting port to said prescribed first connecting port, said port address indicating a location on said network.

4. The connectivity checking method according to claim 1, wherein said prescribed connecting port is a prescribed first connecting port of a first data communication path of said at least one data communication path, wherein said prescribed first connecting port of said first data communication path of said at least one data communication path is different from a second connecting port configured for a second data communication path between said initiator computer and said target computer, and wherein said connectivity checking method further comprises:

when a communication load on said configured second connecting port exceeds a prescribed level, and when it is determined that said connectivity via said prescribed first connecting port is normal, modifying a configuration of said second data communication path to substitute said prescribed first connecting port for said configured second connecting port in said path configuration table.

5. The connectivity checking method according to claim 1, wherein said target computer performs data communication with a management terminal operated by an administrator of said storage system, and wherein said connectivity checking method further comprises:

informing said administrator of said determined connectivity by said management terminal based on a command input by said administrator via said management terminal.

6. The connectivity checking method according to claim 1, wherein said step of determining determines that said connectivity is normal when said echo reply reaches said target computer.

7. The connectivity checking method according to claim 1, wherein said step of determining determines that said connectivity is normal when a reachable rate exceeds a prescribed level, said reachable rate being a rate at which prescribed data from said initiator computer reaches said target computer in response to prescribed data from said target computer.

8. The connectivity checking method according to claim 1, wherein said target computer performs data communication with a user output interface for outputting prescribed data to an administrator of said storage system, and wherein said connectivity checking method further comprises:

when it is determined that said connectivity is abnormal between said target computer and said initiator computer via said prescribed connecting port, informing said administrator of a reason that said connectivity is abnormal by said user output interface.

9. The connectivity checking method according to claim 1, wherein said target computer performs data communication with a user input interface for receiving prescribed data input by an administrator of said storage system, and wherein said connectivity checking method further comprises:

acquiring an initiator address from said administrator by said user input interface, said initiator address indicating a location of said initiator computer on said network.

10. The connectivity checking method according to claim 1, wherein said target computer performs data communication with a user input interface for receiving prescribed data input by an administrator of said storage system, and a storage name server managing an initiator address indicating a location of said initiator computer on said network in relation to said initiator name identifying said initiator computer, and wherein said connectivity checking method further comprises:

acquiring said initiator name from said administrator by said user input interface; and acquiring said initiator address from said storage name server, said initiator address being managed by said storage name server in relation to said initiator name.

11. The connectivity checking method according to claim 1, wherein said target computer performs data communication with a storage name server managing a storage domain defining a combination of said initiator computer and said target computer, as well as an initiator address indicating a location of said initiator computer defined by said storage domain on said network, and wherein said connectivity checking method further comprises:

acquiring said initiator address from said storage name server, said initiator address indicating said location of said initiator computer defined by said storage domain as said combination with said target computer which said storage system comprises.

12. The connectivity checking method according to claim 1, wherein communication between said initiator computer and said target computer is based on an Internet Small Computer System interface (iSCSI) protocol.

13. A storage system comprising:

a plurality of connecting ports for connecting to an Internet Protocol network;

a plurality of target computers for providing a prescribed storage volume via any of said plurality of connecting ports to a plurality of initiator computers connected to said network, wherein at lest one data communication path between said target computers and said initiator computers is configured;

a path configuration table that stores, for each said at least one data communication path, a target name that identifies a target computer of the plurality of target computers, an initiator name that identifies an initiator computer of the plurality of initiator computers, and a port name that identifies a prescribed connecting port of the plurality of connecting ports;

an echo request unit that transmits an echo request based on an Internet Control Message Protocol from said target computer identified by said stored target name to said initiator computer identified by said stored initiator name via said prescribed connecting port of said at least one data communication path; and a connectivity checking unit that determines connectivity between said target computer and said initiator computer via said at least one data communication path including said prescribed connecting port based on a reachable status of an echo reply in said target computer, said echo reply being transmitted from said initiator computer in response to said transmitted echo request, wherein a new data communication path between said initiator computer and said target computer is configured via a connecting port other than said prescribed connecting port, and wherein when it is determined that connectivity via said new data communication path including said prescribed connecting port is normal, a configuration of said new data communication path is registered in said path configuration table.

14. The storage system according to claim 13,
wherein said prescribed connecting port is a prescribed first connecting port of a first data communication path of said at least one data communication path,
wherein said prescribed first connecting port of said first data communication path of said at least one data communication path is different from a second connecting port configured for a second data communication path between said initiator computer and said target computer, and
wherein said storage system further comprises:
a configuration modifying unit that, when a communication malfunction occurs in said configured second connecting port, and when it is determined that said connectivity via said prescribed first connecting port is normal, modifies a configuration of said second data communication path to substitute said prescribed first connecting port for said configured second connecting port in said path configuration table.

15. The storage system according to claim 14, further comprising:
a port address assigning unit that assigns a port address assigned to said configured connecting port to said prescribed first connecting port, said port address indicating a location on said network.

16. The storage system according to claim 13,
wherein said prescribed connecting port is a prescribed first connecting port of a first data communication path of said at least one data communication path,
wherein said prescribed first connecting port of said first data communication path of said at least one data communication path is different from a second connecting port configured for a second data communication path between said initiator computer and said target computer, and
wherein said storage system further comprises:
a configuration modifying unit that, when a communication load on said configured second connecting port exceeds a prescribed level, and when it is determined that said connectivity via said prescribed first connecting port is normal, modifies a configuration of said second data communication path to substitute said prescribed first connecting port for said configured second connecting port in said path configuration table.

17. The storage system according to claim 13,
wherein said target computer performs data communication with a management terminal operated by an administrator of said storage system, and
wherein said storage system further comprises:
an information unit that informs said administrator of said determined connectivity by said management terminal based on a command input by said administrator via said management terminal.

18. The storage system according to claim 13,
wherein said connectivity checking unit determines that said connectivity is normal when said echo reply reaches said target computer.

19. The storage system according to claim 13,
wherein said connectivity checking unit determines that said connectivity is normal when a reachable rate exceeds a prescribed level, said reachable rate being a rate at which prescribed data from said initiator computer reaches said target computer in response to prescribed data from said target computer.

20. The storage system according to claim 13,
wherein said target computer performs data communication with a user output interface for outputting prescribed data to an administrator of said storage system, and
wherein said storage system further comprises:
an information unit that, when it is determined that said connectivity is abnormal between said target computer and said initiator computer via said prescribed connecting port, informs said administrator of a reason for that said connectivity is abnormal by said user output interface.

21. The storage system according to claim 13,
wherein said target computer performs data communication with a user input interface for receiving prescribed data input by an administrator of said storage system, and
wherein said storage system further comprises:
an initiator address acquiring unit that acquires an initiator address from said administrator by said user input interface, said initiator address indicating a location of said initiator computer on said network.

22. The storage system according to claim 13,
wherein said target computer performs data communication with a user input interface for receiving prescribed data input by an administrator of said storage system, and a storage name server managing an initiator address indicating a location of said initiator computer on said network in relation to said initiator name identifying said initiator computer, and
wherein said storage system further comprising:
an initiator name acquiring unit that acquires said initiator name from said administrator by said user input interface; and
an initiator address acquiring unit that acquires said initiator address from said storage name server, said initiator address managed by said storage name server in relation to said acquired initiator name.

23. The storage system according to claim 13,
wherein said target computer performs data communication with a storage name server managing a storage domain defining a combination of said initiator computer and said target computer, as well as an initiator address indicating a location of said initiator computer defined by said storage domain on said network, and
wherein said storage system further comprises:
an initiator address acquiring unit that acquires said initiator address from said storage name server, said initiator address indicating said location of said initiator computer defined by said storage domain as said combination with said target computer which said storage system comprises.

24. The storage system according to claim 13,
wherein communication between said initiator computer and said target computer is based on an Internet Small Computer System Interface (iSCSI) protocol.

* * * * *